United States Patent
Belkin et al.

(10) Patent No.: US 7,701,859 B2
(45) Date of Patent: Apr. 20, 2010

(54) METHOD AND APPARATUS FOR IDENTIFYING PROBLEM CAUSES IN A MULTI-NODE SYSTEM

(75) Inventors: Ruslan V. Belkin, Santa Clara, CA (US); Matthew Helgren, Austin, TX (US)

(73) Assignee: Oracle America, Inc., Redwood Shores, CA (US)

( * ) Notice: Subject to any disclaimer, the term of this patent is extended or adjusted under 35 U.S.C. 154(b) by 541 days.

(21) Appl. No.: 11/354,703

(22) Filed: Feb. 14, 2006

(65) Prior Publication Data

US 2007/0192150 A1    Aug. 16, 2007

(51) Int. Cl.
G06F 11/00 (2006.01)
(52) U.S. Cl. .................................. 370/242; 370/241
(58) Field of Classification Search .................. 370/241, 370/242; 714/100, 1, 25, 26
See application file for complete search history.

(56) References Cited

U.S. PATENT DOCUMENTS

| | | | | |
|---|---|---|---|---|
| 5,513,312 | A * | 4/1996 | Loebig | 714/3 |
| 6,862,351 | B2 * | 3/2005 | Taylor | 379/221.06 |
| 7,409,593 | B2 * | 8/2008 | Aaron | 714/26 |
| 7,409,604 | B2 * | 8/2008 | Murphy et al. | 714/48 |
| 2002/0073062 | A1 * | 6/2002 | Cerami et al. | 707/1 |

OTHER PUBLICATIONS

"New SenSage 3.5 Smashes Event Data Management Barriers: Scalability, Retention, and Analysis", SenSage Press Release, Oct. 10, 2005, 3 pgs.

"Fidelia Products—NetVigil", retrieved from http://www.fidelia.com/products/netvigil.php Oct. 19, 2005, 2 pgs.

"ProactiveNet Announces ProactiveNet 6.5 for Windows", Business Services Management Software Solutions—ProactiveNet Press Release, Aug. 2, 2005, retrieved from http://www.proactivenet.com/news/pressview_2005.asp?pr=080205 Oct. 19, 2005, 2 pgs.

"SEC—simple event correlator", SEC—open space and platform independent event correlation tool, retrieved from http://simple-evcorr.sourceforge.net/ Oct. 19, 2005, 3 pgs.

"Centauri Business Service Manager—IT-business alignment and process optimization", Proxima Technology, 4 pgs.

"Service Level Management Buyer's Guide—$2^{nd}$ Edition", Proxima Technology, © 2004 Enterprise Management Associates, Inc., 4 pgs.

* cited by examiner

Primary Examiner—William Trost, IV
Assistant Examiner—Charles C Jiang
(74) Attorney, Agent, or Firm—Osha•Liang LLP

(57) ABSTRACT

An SLO (service level objective) is represented by a model that includes nodes that represent elements in a system that are used to fulfill the SLO and information that represents dependencies between the elements. Telemetry information is received describing a condition of an element in the system. The telemetry information can be applied to a particular procedure associated with a particular node in the model to determine if there is a problem associated with the element represented by the particular node. At least a portion of the telemetry information is applied to procedures to determine problem cause information describing which elements have problems relating to the SLO. A relative contribution of elements to a problem associated with the SLO is determined by analyzing the problem cause information and the dependencies between the elements.

26 Claims, 6 Drawing Sheets

METHOD AND APPARATUS FOR IDENTIFYING PROBLEM CAUSES IN A MULTI-NODE SYSTEM

BACKGROUND

For most corporations, services and applications are deployed by an internal IT organization on behalf of an internal customer. This relationship between the service owner and the operator of the service is typically formalized in a Service Level Agreement (SLA). The SLA will define the expected QoS (Quality of Service) that will be delivered by the service operator. The challenge for the service operator is to measure against the SLA and ensure that the service is consistently delivered at the appropriate level. Ultimately, the best QoS and cost efficiencies will be gained when the SLA lifecycle can be automated. The SLA life-cycle involves translating the SLA into individual Service Level Objectives (SLO) which are individual metrics that depend on Key Performance Indicators (KPI). KPIs are performance statistics that must constantly be measured to know if a particular SLO is being met or violated. The full SLA life-cycle is monitoring the SLO and making adjustments to the infrastructure when SLOs are violated or are in jeopardy of being violated.

A Service Level Management (SLM) tool measures KPIs to determine SLO violations. Many SLM tools use a reactive approach in which performance problems are identified after the fact an SLO violation has occurred. Some SLM tools use a more predictive approach by using self-learning techniques. These tools learn the typical behavior of the system by capturing daily, weekly, and monthly activities. They then compare the current performance metrics to the historical ones and trigger alarms when pre-set thresholds are violated.

Most SLM tools however, do not have any specific knowledge of the inner workings of elements such as application servers. Therefore, the SLM tool provides limited performance monitoring. For example, if a J2EE application makes requests of multiple back-end nodes such as directory servers, message queues or legacy systems, there is no easy mechanism to break down the response time across these components. Thus, when an SLO is violated, it is quite difficult to track down the actual cause of the violation. The problem is exasperated with web services, as a particular request may not only span multiple nodes within the datacenter, but may span across the internet as well.

Accordingly, there is a need for systems and methods that allow automatic discovery of problems pertinent to SLO's associated with SLAs.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

BRIEF DESCRIPTION OF THE DRAWINGS

The systems and methods described herein are illustrated by way of example, and not by way of limitation, in the figures of the accompanying drawings. Similar reference numbers are used throughout the drawings to reference similar elements and features.

DETAILED DESCRIPTION OF EMBODIMENT(S)

The systems and methods described herein determine one or more causes of a problem associated with a service level objective. For purposes of explanation, numerous specific details are set forth in order to provide a thorough understanding of the various systems and methods. It will be apparent, however, that the systems and methods described herein may be implemented without these specific details. The specification and drawings are, accordingly, to be regarded in an illustrative rather than a restrictive sense.

Architectural Overview

Figure 1:
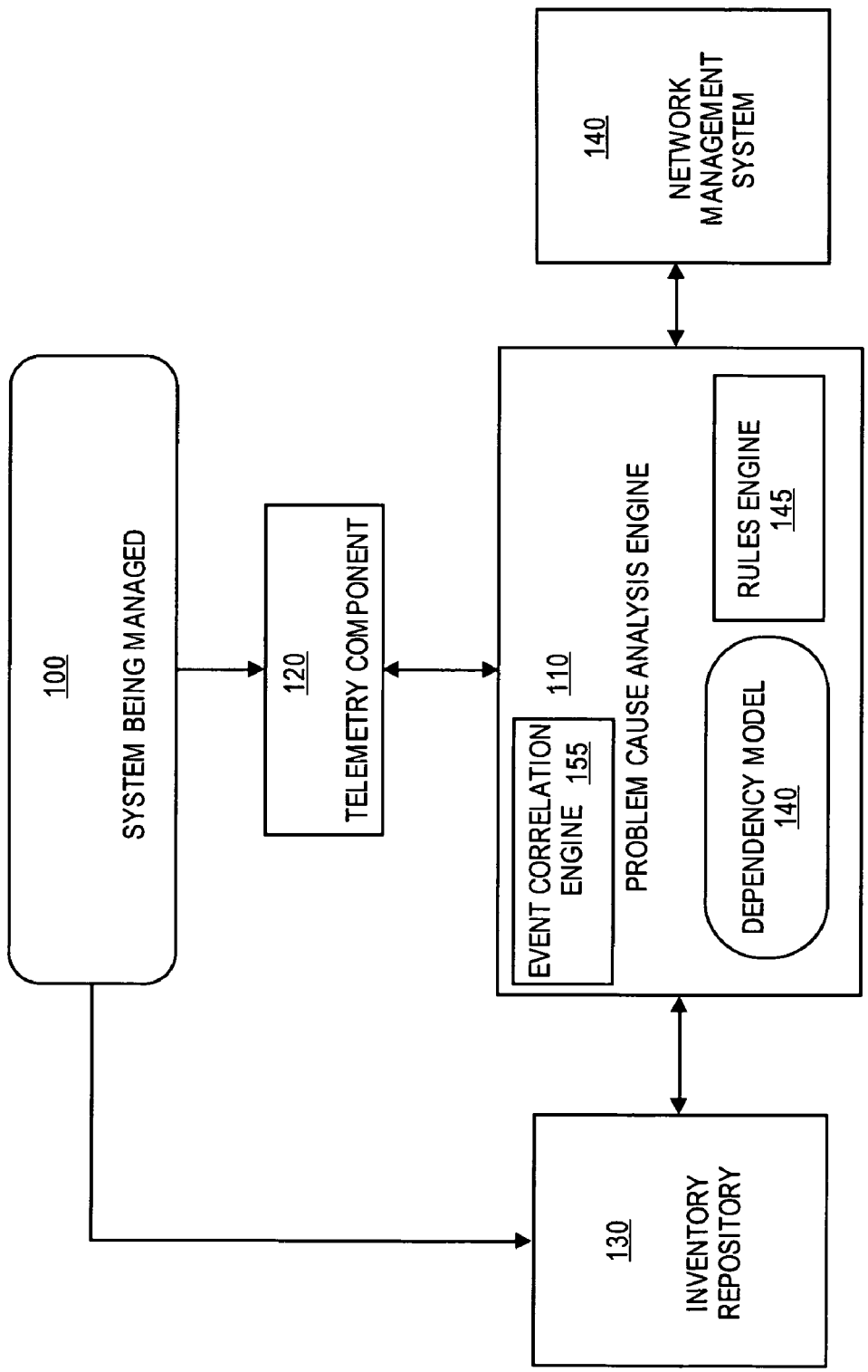
FIG. 1 illustrates a problem cause analysis engine in an example environment in which the systems and methods discussed herein may be implemented.

The environment in FIG. 1 includes a problem cause analysis engine 110 that is used to determine causes of problems associated with SLOs, in accordance with an embodiment of the present invention. The SLOs are set up against elements (e.g., services and resources) associated with the system being managed 100 (the system). The problem cause engine 110 is coupled to a telemetry component 120, an inventory repository 130, and a network management system module 140.

Problem Cause Engine

The problem cause engine 110 has a dependency model 140 that is used to determine one or more causes of a problem associated with an SLO. In one embodiment, the dependency model 140 comprises a graph having nodes representing elements associated with the system 100 and associations between the nodes representing dependencies between the elements. An example of a dependency is an application server depending upon a CPU upon which the application server executes.

The problem cause engine 110 has a rules engine 145 that applies rules to the dependency model 140 to determine one or more causes of a problem associated with an SLO. The event correlation engine 155 receives telemetry from the telemetry component 120 and passes the telemetry to the dependency model 140. The telemetry information may be used to determine whether there are problems with elements used to fulfill an SLO. The event correlation engine 155 also communicates with the telemetry component 120 to establish monitoring of elements in the system 100.

Inventory Repository

The inventory repository 130 is responsible for maintaining configuration information relevant to the system 100. Configuration information includes information about elements (e.g., resources and services) and their associations. Resource configuration information includes, but is not limited to hardware configuration information such as the type of computer system, number and type of processors, amount and type of memory and disk. Resource configuration information also includes, but is not limited to, software configuration information such as the type and versions of application servers, operating systems, and service access points. Service configuration information relates aggregations of hardware and software resources that are used to operate the service.

association is used to represent a dependency between two elements. For example, if an application server is dependent upon a CPU, the inventory repository 130 has an association to represent this dependency. The association can be between two hardware resources, two software resources, a hardware resource and a software resource, a service and any hardware or software resource, etc.

The inventory repository 130 holds the initial configuration information, which is dynamically managed by the inventory repository 130. The inventory repository 130 can discover associations between the elements. Some associations can be input via the network management system 140.

The inventory repository 130 is queryable by other components in the system to determine what elements are defined and need to be monitored. For example, the problem cause engine 110 queries the inventory repository 130 to determine how to construct a dependency model 140 of elements used to satisfy an SLO.

In one embodiment, the inventory repository 130 has an event notification interface to notify other components when elements are added to or removed from system 100. Since these changes might involve multiple entities in the inventory (associations, etc.) it is desirable to have a transactional view of the changes that occur. The inventory repository 130 makes this possible through composite events that can be sent to consumers, such as the problem cause engine 110, to represent a set of atomic changes that have been made.

In one embodiment, the inventory repository 130 includes an XML file that lists resources and services under management.

Telemetry Component

The telemetry component 120 is responsible for monitoring all the resources in the system 100. Monitoring functions include, but are not limited to, performance monitoring (e.g., how many requests were processed per second) and availability monitoring (e.g., whether the application server instance up). The telemetry component 120 is able to provide performance reports and threshold monitoring for one or more resources, each having one or more attributes. For example, the problem cause engine 110 could request that performance monitoring reports be produced every 30 seconds containing the maximum response time of a particular service access point (performance monitoring) or request that an alarm notification be sent to a listener method whenever the response time crosses a pre-defined threshold of 500 ms (threshold monitoring).

The telemetry component 120 supports complex monitoring jobs scheduling. A monitoring job schedule specifies the frequency and start of a monitoring job. A monitoring job can be started immediately or at some other date and time in the future.

Performance reports can be created to obtain the distribution of an attribute's value instead of the value itself. For instance, the distribution for an attribute of a service access point resource may be an array of buckets that accounts for the distribution of the attribute values over time. The number of entries (or buckets) in the array depends on the buckets granularity and the deviation of the attribute value during the monitoring period. The bucket's granularity, resource instance and attribute's name are defined at the time of the monitoring job creation.

Process Overview

A client contacts the network management system 140 to establish one or more service level objectives (SLOs). Together, a group of SLOs make up a service level agreement (SLA). The SLOs can be pre-defined, or user defined. The SLOs are defined in terms of specific key quality indicators (KQI) against management attributes. For example, a KQI can be response time, CPU utilization, etc. The problem cause engine 110 interfaces with the network management system 140 to obtain a list of SLOs and their definitions. The following are examples of SLOs:

No more than 20% of all requests may exceed 200 ms.

Overall resource capacity may not be less than 2000 transactions/sec.

Overall CPU utilization on all resources may not exceed 50%.

The problem cause engine 110 accesses the inventory repository 130 to determine which elements in the system 100 are being used to satisfy each SLO. The problem cause engine 110 also discovers dependencies between the elements from the associations stored in the inventory repository 130.

Based on the SLOs and element dependencies, the problem cause engine 110 constructs a dependency model 140, wherein the dependency model 140 includes nodes that represent elements in the system that are used to fulfill the SLOs and information that represents dependencies between the elements. For example, the dependency model 140 can be a graph with nodes representing the elements and associations between the nodes representing dependencies between the elements.

The problem cause engine 110 provides information to the telemetry component 120 to set up appropriate monitoring jobs on the elements, such that the problem cause engine 110 can learn if there are problem causes associated with the elements. As the telemetry information is provided to the problem cause engine 110, the problem cause engine 110 invokes procedures associated with the dependency model 140 to determine if there is a problem associated with an SLO and a relative contribution of elements in the system 100 that are causes of the problem. There may be one or more elements that are a cause of a given problem. There may be multiple problems associated with a given SLO. The problem cause engine 110 may also determine a confidence level of each problem cause.

If there is an SLO violation, the problem cause engine 110 reports the violation, along with one or more causes of the violation. The report can include a list of elements that are responsible for the SLO violation, along with a relative contribution of each element to the violation. The problem cause engine 110 can also report that although a given SLO is not currently being violated, there are one or more problems associated with the SLO. For example, the problem cause engine 110 reports a problem with one or more elements used to fulfill the SLO.

The inventory repository 130 can be updated in response to information in the report indicating a change to the configuration of the system 100, which may result in a subsequent revalidation of problem cause engine dependency model 140.

Example Dependency Model

Figure 2:
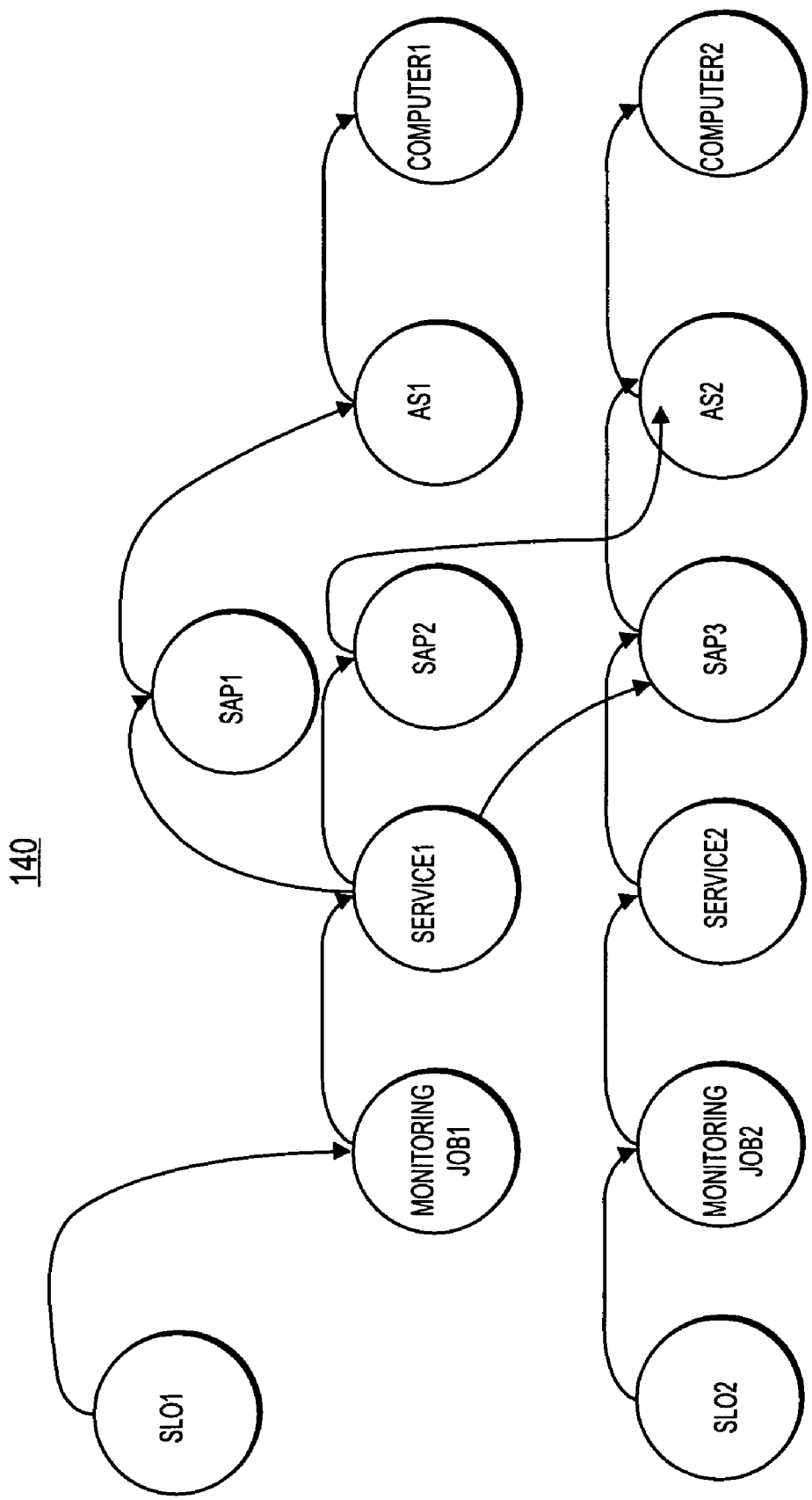
FIG. 2 illustrates a graph representing dependencies between elements used to satisfy service level objectives, in accordance with an embodiment of the present invention.

FIG. 2 is a model 140 representing dependencies between elements used to satisfy service level objectives, in accordance with an embodiment of the present invention. The elements include services and resources. The model 140 has nodes associated with two different SLOs (SLO1, SLO2). The term node, as used herein, is used to represent elements including hardware and software resources, services that can be realized by the hardware and software resources, as well as administrative nodes. The arrows between nodes indicate dependencies. A node depends on a node to which the arrow points. For example, the application server nodes (AS1, AS2) depend on the computer nodes (computer1, computer2).

Each of the nodes is implemented as one or more software objects, in one embodiment. The SLO nodes represent the SLO. For example, node SLO1 may represent an SLO of "overall system capacity may not be lower then 1500 ops/sec." The monitoring job nodes are top-level placeholder objects that hold objects for other nodes. The SLO nodes and monitoring nodes are examples of administrative nodes.

The service nodes (Service1 and Service2) represent a service provided by the system 100. The service nodes can be conceptualized as an aggregate of the resource nodes on which they depend. For example, a service can be comprised of multiple URLs (represented as Service Access Points in the graph). Often, customers are interested in the SLOs that involve services. Hence, a given SLO in the graph will often have a service node. However, not all SLOs relate to a service (and underlying resources). Some SLOs relate directly to a resource. In this case, the SLO would not have a service node.

Example resource nodes are as follows. The service access point nodes (SAP1, SAP2, SAP3) represent service access point resources as defined in the system 100. The application service nodes (AS1, AS2) represent application servers in the system 100. The computer nodes represent CPUs in the system 100 upon which application servers may execute.

A given node can be a part of more than one SLO. For example, Computer2 node and AS2 node are a part of both SLO1 and SLO2. Typically, a graph will have many more SLOs and nodes. It is not required that nodes of all of the types shown in FIG. 2 be used. For example, it is not required that an SLO have a service node. Moreover, nodes of many other types may be used, especially with respect to resource nodes.

Constructing a Dependency Model

Figure 3:
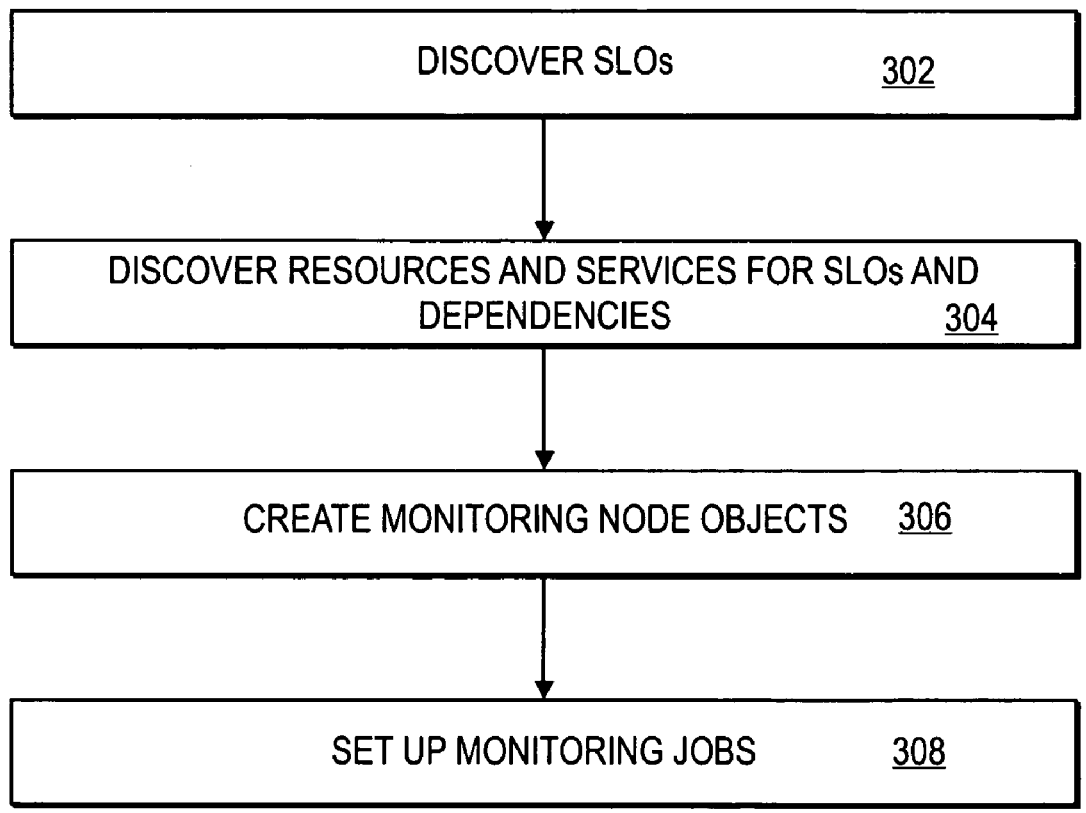
FIG. 3 is a flowchart illustrating steps of a process of constructing a model used to determine one or more causes of a problem associated with a service level objective, in accordance with an embodiment of the present invention.

FIG. 3 is a flowchart illustrating steps of a process constructing a dependency model 140 used to determine one or more causes of a problem associated with a SLO, in accordance with an embodiment of the present invention. In step 302, the problem cause engine 110 accesses the network management system 140 to obtain a list of SLOs. The SLOs provide some information about how to construct the dependency model 140, such as what service and KQIs are of relevant for the SLO.

In step 304, the problem cause engine 110 discovers the elements used to fulfill the SLOs and dependencies between the elements. The elements may include services and resources. For example, using the example in FIG. 2, the problem cause engine 110 accesses the inventory repository 130 to determine that service 1 relies on SAP1, SAP2, and SAP3. Further, the inventory repository 130 has information that indicates that SAP1 depends on AS1, and that AS1 depends on computer1. Similarly, the inventory repository 130 has information that indicates that SAP2 depends on AS2, and that AS2 depends on computer2. Similarly, the inventory repository 130 has information that indicates that SAP3 depends on AS2. The inventory repository 130 has an association list that describes the dependencies, in one embodiment.

In step 306, the problem cause engine 110 creates monitoring node objects for the resources and services. For example, the problem cause engine 110 creates objects for each of the nodes depicted in the graph 200 of FIG. 2. The problem cause engine 110 can also create objects for administrative nodes, such as an SLO node and monitoring job node.

In step 308, the problem cause engine 110 communicates with the telemetry component 120 to establish monitoring jobs. The problem cause engine 110 walks the dependency model 140, and for each monitoring object, the problem cause engine 110 consults the telemetry component 120 to determine if the particular object can be monitored. For example, the telemetry component 120 may, or may not, be able to provide telemetry for a service node. However, telemetry may be available for one or more of the resource nodes that the service depends upon. For the monitorable objects, the problem cause engine 110 sets up a monitoring job with the telemetry component 120.

The dependency model 140 can be updated under certain conditions. For example, new SLOs can be added, SLOs can be dropped, and SLOs can be changed. Further, the resources in the system 100 can change. For example, if the resources used to support a given service change, then the dependency model 140 should be updated.

Determining a Problem Cause

Figure 4:
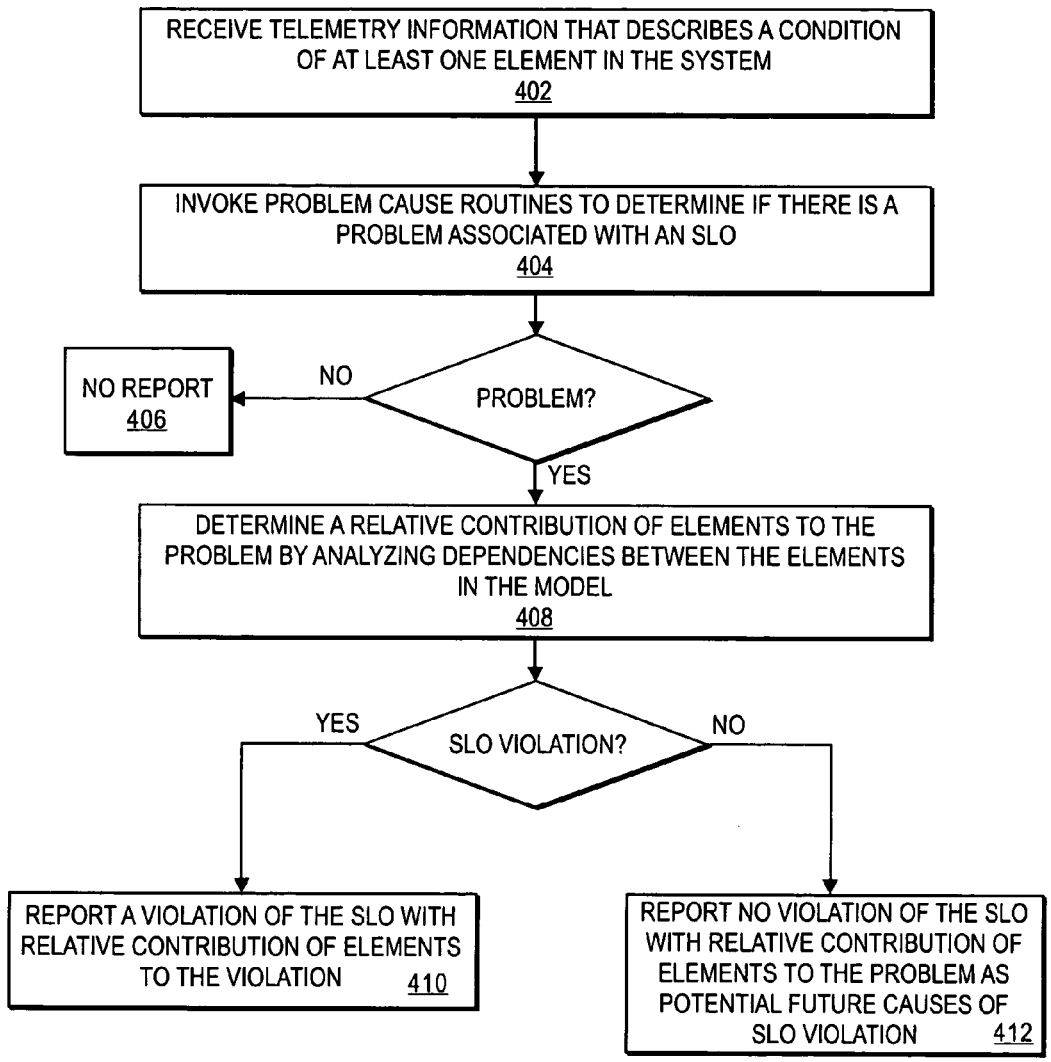
FIG. 4 is a flowchart illustrating steps of a process for determining one or more causes of a problem associated with a service level objective, in accordance with an embodiment of the present invention.

FIG. 4 is a flowchart illustrating steps of a process for determining one or more causes of a problem associated with a SLO, in accordance with an embodiment of the present invention. For convenience, the steps are described in a particular order. However, the steps can be performed in a different order. FIG. 4 is discussed in connection with SLO1 of the model in FIG. 2. In step 402, telemetry information that describes a condition of at least one element in the system 100 is received. The telemetry information is provided to appropriate nodes in the dependency model 140. The telemetry information can be applied to a particular procedure associated with a particular node in the dependency model 140 to determine if there is a problem associated with the element represented by the particular node. For example, telemetry information can be provided to a procedure associated with a computer node to determine if there is a problem associated with the computer node. A node may need to decode the telemetry in order to be able to apply the telemetry to its procedure.

In step 404, problem cause routines are invoked to determine if there is a problem associated with an SLO. For example, problem cause routines are invoked for at least some of the nodes in the model 140 of FIG. 2. Note that some of the nodes may not have a problem cause routine. For example, a monitoring job node will not necessarily have a problem cause routine associated with it. The procedures associated with each node determine if there are problem causes with the element represented by the node. If so, those problems are added to a list of problem causes.

In one embodiment, the sequence of invoking problem cause routines is as follows. First, a problem cause routine is invoked for the service node associated with SLO1 in the dependency model 140 of FIG. 2. When a procedure is invoked at the service node level, this causes recursive invocation of procedures associated with nodes that represent resources upon which the service depends. For example, when the procedure for service 1 is invoked, procedures associated with nodes SAP1, SAP2, and SAP3 are invoked. The procedure associated with SAP1 in turn invokes a procedure associated with node AS1, which invokes a procedure associated with computer1. However, the procedures do not have to be invoked in this order.

If none of the procedures determines a problem associated with the SLO, then the process ends without generating a problem report for this SLO, in step 408. If there is a problem associated with the SLO, then control passes to Step 408 to determine a relative contribution of the elements to the problem by analyzing the dependencies between the elements in the dependency model 140.

For illustrative purposes, SLO1 will be defined as "overall system capacity may not be lower than 1500 ops/sec." Moreover, the procedures associated with node AS1 and node AS2 each report that the respective elements in the system are not functioning. For example, the telemetry information indicates that those application servers are down. In this example, application server AS1 and application server AS2 could be each assigned a relative contribution of 0.5. Further, a confidence level can be assigned to the causes as well. The assignment of the relative contributions is performed by a monitoring node, in one embodiment.

Note that problem cause information may be generated for other elements associated with SLO1, such as computer1 and computer2 to determine if there are additional problem causes associated with the SLO. The dependencies between the elements represented in the dependency model 140 is analyzed to determine the relative contribution of the elements to the problem with the SLO. For example, if there is a problem with a computer node, the analysis might assign a high contribution to the computer node and a low (or even no) contribution to any application server node that depends on the computer node.

If there was a violation of an SLO, then control passed to Step 410 to report a violation of the SLO with a relative contribution of the problem causes. For example, the monitoring node reports that SLO1 was violated and that application servers AS1 and AS2 are each responsible for half of the problem.

If an SLO violation was determined to have not occurred, then control passes to Step 412 to report no violation of the SLO but with potential future causes of an SLO violation. The reason for this step is that in some cases, there will be a problem without a violation of an SLO. For example, consider the case in which the telemetry indicates that application server AS1 experiences total failure and that application servers AS2 and AS3 have no problems. The SLO1 of 1500 ops/sec could still be satisfied. In this case, the monitoring node could report that there is no SLO violation of SLO1, but that there is a problem with application server AS1.

Reporting the problem with application server AS1 as a potential future cause of an SLO violation allows proactive steps to be taken to reduce the possibility of an actual SLO violation, by allowing application server AS1 to be repaired or replaced prior to another application server going down.

The process can then be repeated, wherein the problem cause engine 110 determines if there is a violation of another SLO by applying a similar procedure to another part of the model 140.

Applying Information to Procedures to Determine Problem Cause Information

Figure 5:
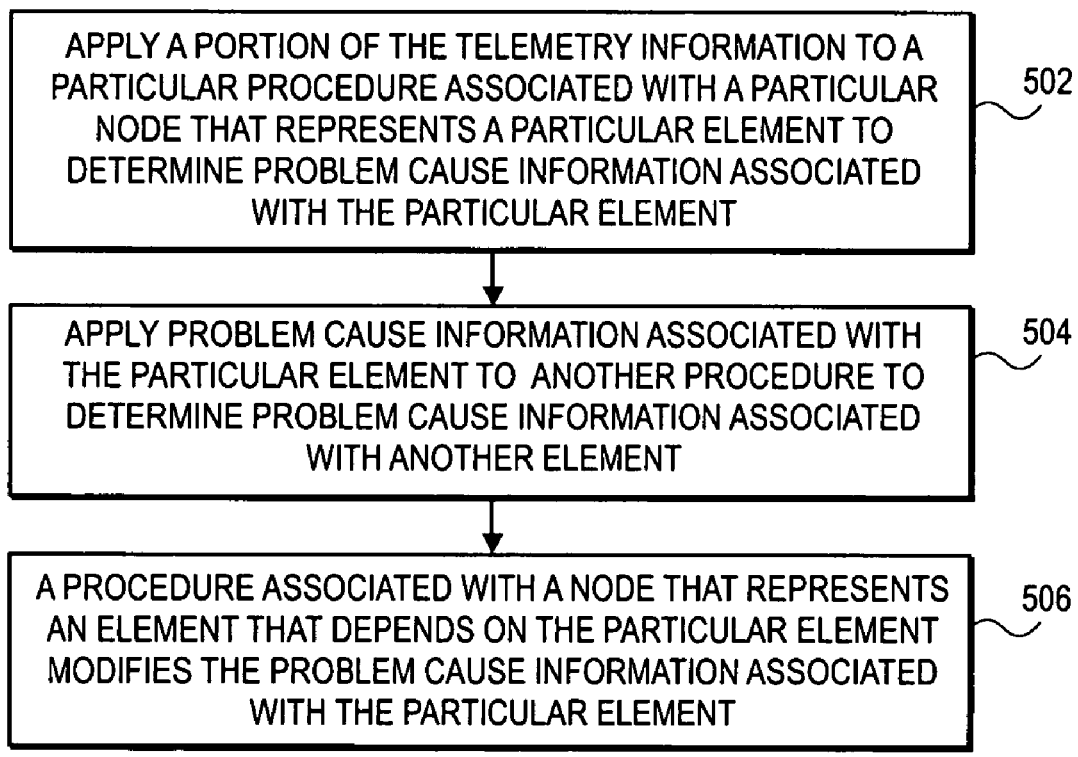
FIG. 5 is a flowchart illustrating steps of a process of applying information to a dependency model to determine causes of a problem associated with a service level objective, in accordance with an embodiment of the present invention.

FIG. 5 is a flowchart illustrating a process of applying information to procedures to determine problem cause information, in accordance with an embodiment of the present invention. For convenience, the steps are described in a particular order. However, the steps can be performed in a different order. FIG. 5 is discussed with respect to SLO1 of FIG. 2. In step 502, a portion of the telemetry information is applied to a first procedure associated with a first of the nodes that represents a first element to determine problem cause information associated with the first element. For example, the telemetry information that computer node 1 has is applied to a procedure associated with computer node 1. As an example, the procedure may include a rule similar to the following:

If CPU_Utilization>warning_threshold,
then ProblemCause->(Computer1, Utilization_Problem).

The CPU_utilization is based on the telemetry information. The problem cause is added to a list of problem causes, along with an identifier of computer1. The rule is evaluated in the rule engine 145, in accordance with one embodiment.

As another example, the telemetry information of node AS1 has is applied to a procedure associated with node AS1. As an example, the procedure may include a rule similar to the following:

If request_rate>nominal_capacity,
then ProblemCause->(AS1, Capacity).

This problem cause indicates that the application server is running out of capacity. The problem cause is added to the list of problem causes, along with an identifier of node AS1. The telemetry of node AS1 can be applied to other rules. For example, telemetry information that indicates that the application server has totally failed may be applied to a rule that results in determining a problem cause of total failure of the element associated with node AS1.

Step 504 is applying problem cause information associated with one element to a procedure associated with a node that represents another element. For example, the problem cause information that was determined by the procedure associated with computer node1 is applied to the procedure associated with node AS1. Note that the element associated with node AS1 depends on the element associated with computer node1. As an example, the procedure associated with node AS1 can have the following rule:

If ProblemCause on ComputerNode 1=Utilization,
then ProblemCause->(AS1, Malfunction).

Step 506 is a modifying the problem cause that was determined by another node. Typically, the procedure that does the modifying is a procedure associated with node that represents an element that depends from the element whose problem is being modified. For example, the procedure associated with node AS1 may modify a problem cause reported by that procedure associated with computer node 1. The modifying can include deleting the problem cause, and possible creating a problem cause.

J2EE Implementation

In a particular embodiment, the system 100 is a Java™ environment implemented using the Java 2 Enterprise Edition (J2EE) platform from Sun Microsystems, Inc. of Palo Alto, Calif. The J2EE platform is designed to provide server-side and client-side support for distributed, multi-tier applications. J2EE is a platform-independent environment that can be used to develop, build and deploy web-based enterprise applications. Enterprise JavaBeans™ (EJB) is a Java application programming interface (API) that defines a component architecture for the multi-tier client/server systems. Java and JavaBeans are trademarks of Sun Microsystems, Inc.

In this Java-based environment, requests are received as HyperText Transfer Protocol (HTTP) request messages. HTTP is the underlying protocol used by the world wide web. HTTP defines how messages are formatted and transmitted, and what actions web servers and web browsers should take in response to various commands. For example, HTTP request messages include an initial line, optional header lines, a blank line and an optional message body. The HTTP request messages use this message body to communicate an action that the originator of the request message would like to have performed and an identifier of a data element on which the action is to be performed.

Hardware Overview

Figure 6:
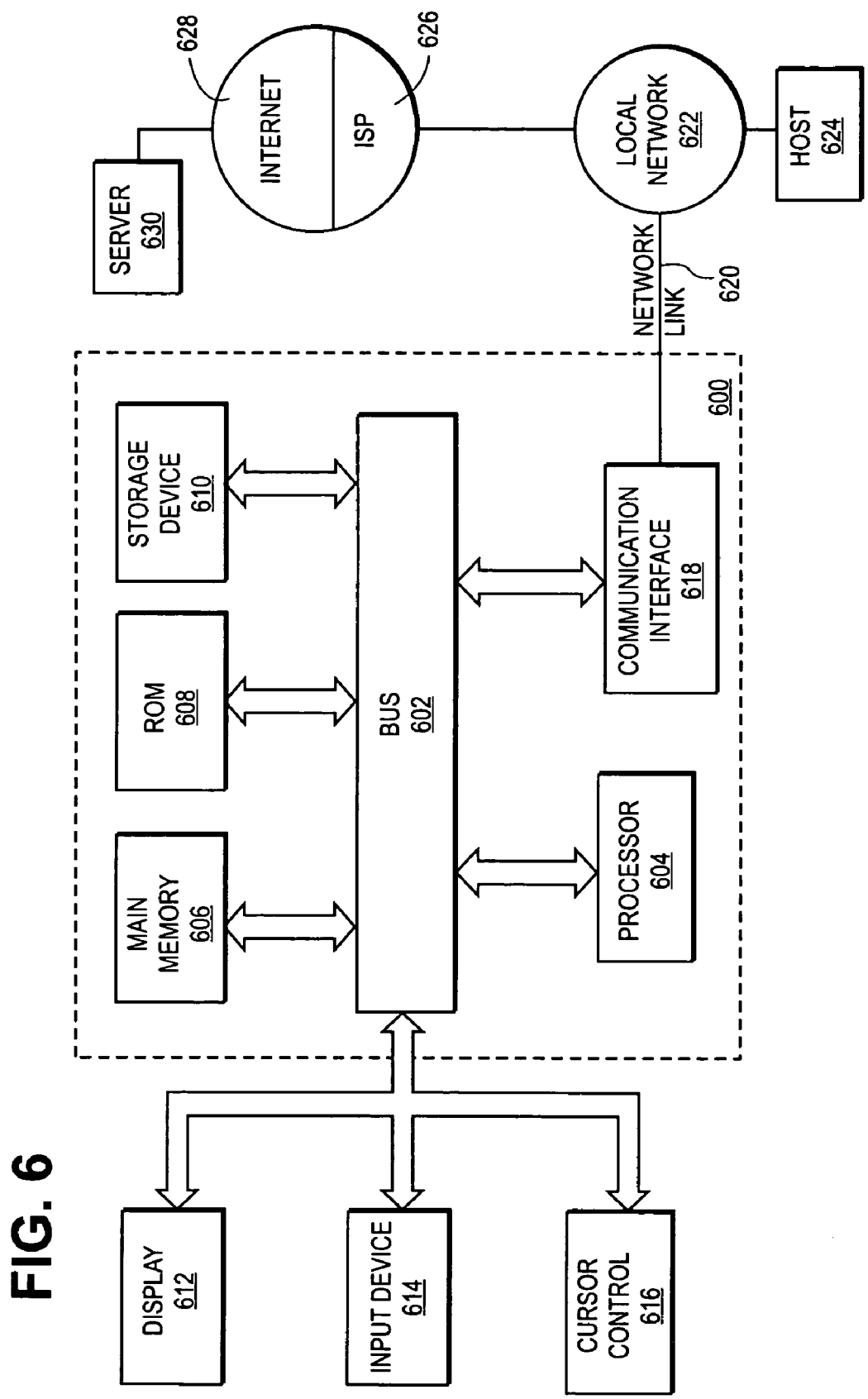
FIG. 6 is a block diagram that illustrates a computer system upon which an embodiment in accordance with the present invention may be implemented.

In one embodiment, the problem cause engine 110 takes the form of sets of instructions that are executed by one or more processors. FIG. 1 shows a simplified block diagram of an apparatus 110 on which these instructions may be executed. FIG. 6 shows one possible embodiment of the apparatus 110 in greater detail. Computer system 600 includes a bus 602 for facilitating information exchange, and one or more processors 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions by processor 604. Computer system 600 may further include a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612 for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

In computer system 600, bus 602 may be any mechanism and/or medium that enables information, data, etc., to be exchanged between the various components. For example, bus 602 may be a set of conductors that carries electrical signals. Bus 602 may further be a network connection that connects one or more of the components. Any mechanism and/or medium that enables information, data, etc., to be exchanged between the various components may be used as bus 602.

Bus 602 may also be a combination of these mechanisms/media. For example, processor 604 may communicate with storage device 610 wirelessly. In such a case, the bus 602, from the standpoint of processor 604 and storage device 610, would be a wireless medium, such as air. Further, processor 604 may communicate with ROM 608 capacitively. Further, processor 604 may communicate with main memory 606 via a network connection. In this case, the bus 602 would be the network connection. Further, processor 604 may communicate with display 612 via a set of conductors. In this instance, the bus 602 would be the set of conductors. Thus, depending upon how the various components communicate with each other, bus 602 may take on different forms. Bus 602, as shown in FIG. 6, functionally represents all of the mechanisms and/or media that enable information, signals, data, etc., to be exchanged between the various components.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 600, various machine-readable media are involved, for example, in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, DVD, or any other optical storage medium, punchcards, papertape, any other physical medium with patterns of holes, a RAM, a PROM, and EPROM, a FLASH-EPROM, any other memory chip or cartridge, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims and the equivalents thereof.

What is claimed is:

1. A computer-implemented method for determining one or more causes of a problem with a service level objective (SLO) in a network management system (NMS), the method comprising:

receiving telemetry information describing a condition of at least a first element in the NMS, wherein the first element is a service or a resource used to fulfill the SLO, and wherein the first element is associated with a first node;

invoking a first procedure associated with the first element, wherein the first procedure determines whether the first element is contributing to the problem with the SLO, wherein the problem is indicated by system performance reaching a confidence level specified in the SLO;

determining that the first element has a dependency relationship with a second element in the NMS;

invoking a second procedure associated with the second element, wherein the second procedure determines whether the second element is contributing to the problem with the SLO, and wherein the second element is associated with a second node;

making a determination, using a monitoring node, of one or more causes of the problem with the SLO based at least partially upon results of the first procedure and the second procedure, wherein the problem is based upon at least one from a group consisting of the first element contributing to the problem with the SLO, and the second element contributing to the problem with the SLO, and wherein the NMS comprises the first node, the second node, and the monitoring node operatively connected; and generating, based on the determination, a problem report that indicates one or more causes of the problem with the SLO;

wherein the method is performed by a computing device which, as a result of executing special purpose instructions, has been configured to be a special purpose device.

2. The method of claim 1, wherein the telemetry information comprises performance information for at least the first and second elements.

3. The method of claim 1, wherein the operation of invoking the second procedure is performed by the first procedure.

4. The method of claim 1, wherein generating the problem report comprises generating information indicating which one or more of the first and second elements is contributing to the problem with the SLO.

5. The method of claim 4, wherein generating information indicating which one or more of the first and second elements is contributing to the problem with the SLO comprises:

determining a relative contribution made by each of the first and second elements to the problem with the SLO, wherein determining the relative contribution comprises assigning one or more numerical values indicating proportional contribution by the first and second element to the problem with the SLO; and generating information indicating the relative contribution made by each of the first and second elements.

6. The method of claim 1, further comprising:

prior to generating the problem report:

determining that the second element has a dependency relationship with a third element in the system; and invoking a third procedure associated with the third element, wherein the third procedure determines whether the third element is contributing to the problem with the SLO;

wherein generating the problem report comprises generating, based at least partially upon determinations made by the first, second, and third procedures, information indicating which one or more of the first, second, and third elements is contributing to the problem with the SLO.

7. The method of claim 6, wherein the operation of invoking the second procedure is performed by the first procedure, and wherein the operation of invoking the third procedure is performed by the second procedure.

8. The method of claim 6, wherein generating information indicating which one or more of the first, second, and third elements is contributing to the problem with the SLO comprises:

determining a relative contribution made by each of the first, second, and third elements to the problem with the SLO, wherein determining the relative contribution comprises assigning one or more numerical values indicating proportional contribution by the first, second, and third elements to the problem with the SLO; and generating information indicating the relative contribution made by each of the first, second, and third elements.

9. The method of claim 1, wherein determining that the first element has a dependency relationship with the second element comprises:

accessing a dependency model that specifies dependency relationships between the SLO and a plurality of elements, wherein the plurality of elements comprises elements used to fulfill the SLO, and wherein the dependency model specifies how the plurality of elements depend on each other and how the SLO depends on the plurality of elements.

10. The method of claim 9, further comprising: receiving a set of SLO information indicating one or more performance metrics that need to be met to satisfy the SLO;

receiving a set of repository information identifying the plurality of elements and their interdependencies; and constructing the dependency model based upon the SLO information and the repository information.

11. A computer-readable storage medium storing one or more sequences of instructions embodied therein for execution on a computer system to perform a computer-implemented method, the method comprising:

receiving telemetry information describing a condition of at least a first element in a network management system (NMS), wherein the first element is a service or a resource used to fulfill a service level objective (SLO) in the NMS, and wherein the first element is associated with a first node;

invoking a first procedure associated with the first element, wherein the first procedure determines whether the first element is contributing to a problem with the SLO, wherein the problem is indicated by system performance reaching a confidence level specified in the SLO;

determining that the first element has a dependency relationship with a second element in the NMS;

invoking a second procedure associated with the second element, wherein the second procedure determines whether the second element is contributing to the problem with the SLO, and wherein the second element is associated with a second node;

making a determination, using a monitoring node, of one or more causes of the problem with the SLO based at least partially upon results of the first procedure and the second procedure, wherein the problem is based upon at least one from a group consisting of the first element contributing to the problem with the SLO, and the second element contributing to the problem with the SLO, and wherein the NMS comprises the first node, the second node, and the monitoring node operatively connected; and generating, based on the determination, a problem report that indicates one or more causes of the problem with the SLO;

wherein the method is performed by a computing device which, as a result of executing special purpose instructions, has been configured to be a special purpose device.

12. The computer-readable storage medium of claim 11, wherein the telemetry information comprises performance information for at least the first and second elements.

13. The computer-readable storage medium of claim 11, wherein the operation of invoking the second procedure is performed by the first procedure.

14. The computer-readable storage medium of claim 11, wherein generating the problem report comprises generating information indicating which one or more of the first and second elements is contributing to the problem with the SLO.

15. The computer-readable storage medium of claim 14, wherein generating information indicating which one or more of the first and second elements is contributing to the problem with the SLO comprises:

determining a relative contribution made by each of the first and second elements to the problem with the SLO, wherein determining the relative contribution comprises assigning one or more numerical values indicating proportional contribution by the first and second element to the problem with the SLO; and generating information indicating the relative contribution made by each of the first and second elements.

16. The computer-readable storage medium of claim 11, wherein the one or more sequences of instructions further cause the one or more processors to perform the operations of:

prior to generating the problem report:

determining that the second element has a dependency relationship with a third element in the system; and invoking a third procedure associated with the third element, wherein the third procedure determines whether the third element is contributing to the problem with the SLO;

wherein generating the problem report comprises generating, based at least partially upon determinations made by the first, second, and third procedures, information indicating which one or more of the first, second, and third elements is contributing to the problem with the SLO.

17. The computer-readable storage medium of claim 16, wherein the operation of invoking the second procedure is performed by the first procedure, and wherein the operation of invoking the third procedure is performed by the second procedure.

18. The computer-readable storage medium of claim 16, wherein generating information indicating which one or more of the first, second, and third elements is contributing to the problem with the SLO comprises:

determining a relative contribution made by each of the first, second, and third elements to the problem with the SLO, wherein determining the relative contribution comprises assigning one or more numerical values indicating proportional contribution by the first, second, and third elements to the problem with the SLO; and generating information indicating the relative contribution made by each of the first, second, and third elements.

19. The computer-readable storage medium of claim 11, wherein determining that the first element has a dependency relationship with the second element comprises:

accessing a dependency model that specifies dependency relationships between the SLO and a plurality of elements, wherein the plurality of elements comprises elements used to fulfill the SLO, and wherein the dependency model specifies how the plurality of elements depend on each other and how the SLO depends on the plurality of elements.

20. The computer-readable storage medium of claim 19, wherein the one or more sequences of instructions further cause the one or more processors to perform the operations of:

receiving a set of SLO information indicating one or more performance metrics that need to be met to satisfy the SLO;

receiving a set of repository information identifying the plurality of elements and their interdependencies; and constructing the dependency model based upon the SLO information and the repository information.

21. A computer system, comprising:
one or more processors; and
a storage for storing one or more sequences of instructions which, when executed by the one or more processors, cause the one or more processors to perform the operations of:
receiving telemetry information describing a condition of at least a first element in a network management system (NMS), wherein the first element is a service or a resource used to fulfill a service level objective (SLO) in the NMS, and wherein the first element is associated with a first node;
invoking a first procedure associated with the first element, wherein the first procedure determines whether the first element is contributing to a problem with the SLO, wherein the problem in indicated by system performance reaching a confidence level specified in the SLO;
determining that the first element has a dependency relationship with a second element in the NMS;
invoking a second procedure associated with the second element, wherein the second procedure determines whether the second element is contributing to the problem with the SLO, and wherein the second element is associated with a second node;
making a determination, using a monitoring node, of one or more causes of the problem with the SLO based at least partially upon results of the first procedure and the second procedure, wherein the problem is based upon at least one from a group consisting of the first element contributing to the problem with the SLO, and the second element contributing to the problem with the SLO, and wherein the NMS comprises the first node, the second node, and the monitoring node operatively connected; and
generating, based on the determination, a problem report that indicates one or more causes of the problem with the SLO;
wherein the method is performed by a computing device which, as a result of executing special purpose instructions, has been configured to be a special purpose device.

22. The computer system of claim 21, wherein the one or more sequences of instructions further cause the one or more processors to perform the operations of:
prior to generating the problem report:
determining that the second element has a dependency relationship with a third element in the system; and
invoking a third procedure associated with the third element, wherein the third procedure determines whether the third element is contributing to the problem with the SLO;
wherein generating the problem report comprises generating, based at least partially upon determinations made by the first, second, and third procedures, information indicating which one or more of the first, second, and third elements is contributing to the problem with the SLO.

23. The computer system of claim 22, wherein the operation of invoking the second procedure is performed by the first procedure, and wherein the operation of invoking the third procedure is performed by the second procedure.

24. The computer system of claim 22, wherein generating information indicating which one or more of the first, second, and third elements is contributing to the problem with the SLO comprises:
determining a relative contribution made by each of the first, second, and third elements to the problem with the SLO, wherein determining the relative contribution comprises assigning one or more numerical values indicating proportional contribution by the first, second, and third elements to the problem with the SLO; and
generating information indicating the relative contribution made by each of the first, second, and third elements.

25. The computer system of claim 21, wherein determining that the first element has a dependency relationship with the second element comprises:
accessing a dependency model that specifies dependency relationships between the SLO and a plurality of elements, wherein the plurality of elements comprises elements used to fulfill the SLO, and wherein the dependency model specifies how the plurality of elements depend on each other and how the SLO depends on the plurality of elements.

26. The computer system of claim 25, further comprising:
receiving a set of SLO information indicating one or more performance metrics that need to be met to satisfy the SLO;
receiving a set of repository information identifying the plurality of elements and their interdependencies; and
constructing the dependency model based upon the SLO information and the repository information.

* * * * *

UNITED STATES PATENT AND TRADEMARK OFFICE
CERTIFICATE OF CORRECTION

| | |
|---|---|
| PATENT NO. | : 7,701,859 B2 |
| APPLICATION NO. | : 11/354703 |
| DATED | : April 20, 2010 |
| INVENTOR(S) | : Ruslan V. Belkin et al. |

It is certified that error appears in the above-identified patent and that said Letters Patent is hereby corrected as shown below:

In column 3, line 19, before "association" insert -- An --.

Signed and Sealed this
Twelfth Day of April, 2011

David J. Kappos
*Director of the United States Patent and Trademark Office*